United States Patent
Wang et al.

(10) Patent No.: US 12,216,063 B2
(45) Date of Patent: Feb. 4, 2025

(54) ELECTRONIC DEVICE WHICH CAN DETERMINE A DIRTINESS LEVEL

(71) Applicant: PixArt Imaging Inc., Hsin-Chu (TW)

(72) Inventors: Tsung-Fa Wang, Hsin-Chu (TW); Hung-Ching Lai, Hsin-Chu (TW); Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 884 days.

(21) Appl. No.: 17/242,296

(22) Filed: Apr. 27, 2021

(65) Prior Publication Data

US 2021/0247327 A1 Aug. 12, 2021

Related U.S. Application Data (63) Continuation-in-part of application No. 16/907,329, filed on Jun. 22, 2020, now Pat. No. 11,493,336, and
(Continued)

(51) Int. Cl.
*G01N 21/94* (2006.01)
*G01N 21/88* (2006.01)

(52) U.S. Cl.
CPC ......... *G01N 21/94* (2013.01); *G01N 21/8851* (2013.01); *G01N 2021/8887* (2013.01)

(58) Field of Classification Search
CPC ........ G01N 21/15; G01N 21/94; G01N 21/85; G01N 2021/151; G01N 2021/157; G01N 21/53; G01N 21/05; G01N 15/06; G01N 21/3504; G01N 21/8507; G01N 15/0205; G01N 21/01; G01N 15/075; G01N 21/958; G01N 21/274; G01N 21/552;
(Continued)

(56) References Cited

U.S. PATENT DOCUMENTS 7,161,136 B1 1/2007 Wenstrand
8,600,553 B2 12/2013 Svendsen
(Continued)

FOREIGN PATENT DOCUMENTS

CN 101711353 A 5/2010
CN 102121900 A 7/2011
(Continued)

OTHER PUBLICATIONS

Mao Jin-feng et al., Research of Intelligent Cleanliness Assessment System of Air Duct Cleaning Robot, National Defense Engineering Institute, PLA University of Science and Technology, Building Energy & Environment vol. 34, No. 1, p. 37-41 ,Jan. 25, 2015.
(Continued)

*Primary Examiner* — Michael P Stafira
(74) *Attorney, Agent, or Firm* — Winston Hsu (57) ABSTRACT

An electronic device, comprising: a first light source, configured to emit first light; a second light source, configured to emit second light; a first optical sensor, configured to sense first optical data generated based on reflected light of the first light; a light guiding device, configured to receive the second light; and a second optical sensor, configured to sense second optical data generated based on the second light emitted by the light guiding device. The first optical sensor and the second optical sensor can be integrated to a single optical sensor.

18 Claims, 5 Drawing Sheets

Related U.S. Application Data a continuation-in-part of application No. 16/423,165, filed on May 28, 2019, now Pat. No. 11,523,722.

(58) Field of Classification Search
CPC ......... G01N 2021/152; G01N 15/1459; G01N 21/534; G01N 21/55; G01N 21/31; G01N 21/359; G01N 21/33; G01N 21/65; G01N 21/3577; G01N 2201/062; G01N 21/3563; G01N 21/39; G01N 21/59; G01N 21/532; G01N 21/0303; G01N 2201/08; G01N 2021/154; G01N 21/25; G01N 21/645; G01N 21/03; G01N 21/84; G01N 21/35; G01N 21/255; G01N 21/538; G01N 2201/061; G01N 15/1434; G01N 2015/1493; G01N 21/4738; G01N 2021/945; G01N 2015/0046; G01N 15/0227; G01N 21/8483; G01N 33/18; G01N 2021/399; G01N 15/0211; G01N 21/0332; G01N 2015/1486; G01N 21/8806; G01N 21/314; G01N 2015/0053; G01N 21/27; G01N 2021/9586; G01N 21/64; G01N 21/51; G01N 15/02; G01N 21/474; G01N 2201/0627; G01N 15/1433; G01N 2021/8592; G01N 21/43; G01N 23/223; G01N 21/47; G01N 33/1833; G01N 21/00; G01N 2201/0696; G01N 21/21; G01N 15/0656; G01N 2021/4709; G01N 21/78; G01N 2021/8578; G01N 21/68; G01N 21/86; G01N 21/031; G01N 21/17; G01N 21/276; G01N 2201/0221; G01N 2021/155; G01N 21/6428; G01N 21/718; G01N 21/8851; G01N 2021/3595; G01N 27/66; G01N 21/6486; G01N 21/67; G01N 2201/068; G01N 15/10; G01N 2021/6482; G01N 35/0099; G01N 2021/0389; G01N 21/3103; G01N 1/38; G01N 33/1886; G01N 2021/0112; G01N 21/61; G01N 21/9501; G01N 21/71; G01N 15/1404; G01N 21/88; G01N 35/00029; G01N 15/1429; G01N 2021/8416; G01N 21/75; G01N 27/223; G01N 2201/0633; G01N 2201/12; G01N 33/193; G01N 2021/435; G01N 21/45; G01N 2201/0612; G01N 2201/0621; G01N 33/2823; G01N 35/0092; G01N 35/04; G01N 2021/6484; G01N 2223/076; G01N 33/004; G01N 2015/0238; G01N 2035/1034; G01N 21/553; G01N 21/954; G01N 2015/0092; G01N 2021/8528; G01N 2021/8887; G01N 21/4133; G01N 2201/127; G01N 1/2035; G01N 1/286; G01N 21/6408; G01N 35/00623; G01N 35/085; G01N 2015/012; G01N 2015/016; G01N 2015/018; G01N 2021/651; G01N 21/6402; G01N 2201/024; G01N 2201/129; G01N 33/1826; G01N 35/00; G01N 35/10; G01N 15/01; G01N 2021/8514; G01N 21/251; G01N 21/8901; G01N 21/8915; G01N 21/9009; G01N 33/558; G01N 33/56983; G01N 35/00732; G01N 1/02; G01N 1/20; G01N 2015/019; G01N 21/952; G01N 2201/066; G01N 2291/0289; G01N 27/048; G01N 33/2888; G01N 35/00871; G01N 15/14; G01N 2015/025; G01N 21/648; G01N 35/00009; G01N 2015/1497; G01N 21/278

See application file for complete search history.

(56) References Cited

U.S. PATENT DOCUMENTS

| | | | |
|---|---|---|---|
| 9,320,398 B2 | 4/2016 | Hussey | |
| 9,862,098 B2 | 1/2018 | Zhang | |
| 10,551,843 B2 | 2/2020 | Yee | |
| 11,510,539 B2 | 11/2022 | Ng | |
| 2004/0227954 A1 | 11/2004 | Xie | |
| 2005/0192707 A1 | 9/2005 | Park | |
| 2005/0206617 A1* | 9/2005 | Moyer | G06F 3/0317 345/163 |
| 2006/0044267 A1 | 3/2006 | Xie | |
| 2006/0047364 A1 | 3/2006 | Tani | |
| 2006/0192761 A1 | 8/2006 | Cheah | |
| 2008/0151233 A1* | 6/2008 | Blanke | G01N 21/47 901/47 |
| 2012/0079670 A1 | 4/2012 | Yoon | |
| 2012/0095651 A1 | 4/2012 | Anderson | |
| 2012/0247510 A1 | 10/2012 | Chen | |
| 2013/0258321 A1* | 10/2013 | Jurca | G01N 21/94 356/73 |
| 2014/0115797 A1 | 5/2014 | Duenne | |
| 2014/0124004 A1 | 5/2014 | Rosenstein | |
| 2014/0343846 A1 | 11/2014 | Goldman | |
| 2015/0327742 A1 | 11/2015 | Strang | |
| 2016/0104044 A1 | 4/2016 | Noh | |
| 2016/0370282 A1* | 12/2016 | Zhan | G01N 15/1434 |
| 2017/0332871 A1 | 11/2017 | Sung | |
| 2017/0332872 A1 | 11/2017 | Jun | |
| 2018/0113517 A1 | 4/2018 | Yang | |
| 2018/0289225 A1 | 10/2018 | Izawa | |
| 2018/0348373 A1 | 12/2018 | Chen | |
| 2019/0128821 A1 | 5/2019 | Yang | |
| 2019/0162676 A1* | 5/2019 | Cheng | G01N 21/33 |
| 2019/0239709 A1 | 8/2019 | Thomas | |
| 2020/0079325 A1* | 3/2020 | Tilleman | G01N 21/552 |
| 2020/0107689 A1 | 4/2020 | Yang | |
| 2020/0375426 A1 | 12/2020 | Wang | |
| 2021/0016449 A1 | 1/2021 | Wang | |
| 2022/0066456 A1 | 3/2022 | Ebrahimi Afrouzi | |
| 2022/0178842 A1 | 6/2022 | Wang | |
| 2022/0198705 A1 | 6/2022 | McKenzie | |
| 2022/0222479 A1 | 7/2022 | Hassani | |
| 2022/0284226 A1 | 9/2022 | Lev | |
| 2022/0369886 A1 | 11/2022 | Liao | |
| 2023/0304942 A1 | 9/2023 | Wang | |

FOREIGN PATENT DOCUMENTS

| | | | | |
|---|---|---|---|---|
| CN | 103443612 A | 12/2013 | | |
| CN | 103873786 A | 6/2014 | | |
| CN | 104093016 A | 10/2014 | | |
| CN | 106575366 A | 4/2017 | | |
| CN | 106706644 A | 5/2017 | | |
| CN | 107917918 A | 4/2018 | | |
| CN | 108027239 A | 5/2018 | | |
| CN | 108320275 A | 7/2018 | | |
| CN | 108663371 A | 10/2018 | | |
| CN | 110865637 A | 3/2020 | | |
| DE | 10059240 A1 * | 2/2002 | ............ | G01B 11/14 |
| DE | 102006045916 A1 * | 4/2008 | ............ | G01V 8/20 |
| DE | 102007003023 A1 * | 7/2008 | ............ | G01N 21/15 |
| DE | 102016107312 A1 * | 11/2016 | ............ | G01B 11/00 |
| EP | 3 367 660 A1 | 8/2018 | | |
| GB | 2243968 A * | 11/1991 | ............ | G01H 9/00 |
| JP | 2013-168104 A | 8/2013 | | |
| KR | 10-2011-0124506 A | 11/2011 | | |
| KR | 10-2018-0075176 A | 7/2018 | | |
| TW | 200701037 | 1/2007 | | |
| TW | 201314505 A1 | 4/2013 | | |

(56) References Cited

FOREIGN PATENT DOCUMENTS

| TW | I531984 B | 5/2016 | | |
|----|-----------|--------|---|---|
| WO | WO-2005062026 A1 | * | 7/2005 | ........... B60Q 1/0005 |
| WO | WO-2015199602 A1 | * | 12/2015 | ............ G01N 21/59 |

OTHER PUBLICATIONS

Futao Zhang, The Blemish Detection Research of Camera Module Based on Background Difference, "China's Excellent Master's Thesis Full-text Database (Information Technology Series)". ,Jun. 2017.

Lahiru Jayasinghe etc., Feature Learning and Analysis for Cleanliness Classification in Restrooms, IEEE Access, vol. 7, p. 14871-14882. ,Jan. 21, 2019.

* cited by examiner

ELECTRONIC DEVICE WHICH CAN DETERMINE A DIRTINESS LEVEL

CROSS REFERENCE TO RELATED APPLICATIONS

This application is a continuation-in-part of applicant's earlier application, Ser. No. 16/423,165, filed 2019 May 28, and earlier application, Ser. No. 16/907,329, filed 2020 Jun. 22, which are included herein by reference.

BACKGROUND OF THE INVENTION

1. Field of the Invention

The present invention relates to an electronic device which can automatically determine a dirtiness level, and particularly relates to an electronic device which can automatically determine a dirtiness level according to optical data.

2. Description of the Prior Art

As the technique advances, the auto clean machine (e.g. a robot cleaner) becomes more and more popular. An auto clean machine always has an image sensor to capture images, based on which the auto clean machine can track a location thereof. However, a cover for protecting the image sensor may become dirty if the auto clean machine has worked for a period of time. Such situation may affect the tracking function of auto clean machine.

A conventional auto clean machine does not have a proper solution for such problem, thus a user must clean the cover frequently, or knows that the cover needs to be cleaned only when the automatic cleaning machine does not operate smoothly.

SUMMARY OF THE INVENTION

Therefore, one objective of the present invention is to provide an electronic device which can determine a dirtiness level.

Another objective of the present invention is to provide an optical navigation device which can determine a dirtiness level of a cover for an optical sensor.

One embodiment of the present invention discloses an electronic device, comprising: a first light source, configured to emit first light; a second light source, configured to emit second light; a first optical sensor, configured to sense first optical data generated based on reflected light of the first light; a light guiding device, configured to receive the second light; and a second optical sensor, configured to sense second optical data generated based on the second light emitted by the light guiding device.

Another embodiment of the present invention discloses an electronic device, comprising: a first light source, configured to emit first light; at least one second light source, configured to emit second light; a light guiding device, configured to receive the second light; and an optical sensor, configured to sense first optical data generated based on reflected light of the first light, and configured to sense second optical data generated based on the second light emitted by the light guiding device.

Still another embodiment of the present invention discloses an electronic device, which comprises: a first light source, configured to emit first light; an optical component, disposed in the transmission path of the first light, wherein at least partial of the first light passes through the optical element; and an optical sensor, configured to sense first optical data generated based on reflected light of the first light, wherein the reflected light of the first light is reflected by the optical component and transmitted to the optical sensor.

In view of above-mentioned embodiments, the electronic device provided by the present invention can automatically determine a dirtiness level of the light guiding device. If the electronic device is an optical navigation device, the electronic device can automatically determine a dirtiness level of the cover for the optical sensor. Therefore, the user does not need to frequently check whether the cover is clean or not.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided to explain the concept of the present invention. Please note, each component in the embodiments can be implemented by hardware (e.g. device or circuit) or firmware (e.g. processor installed with at least one program). Further, the term "first", "second" . . . are only for defining different steps or components, but do not mean any sequence thereof.

Figure 1:
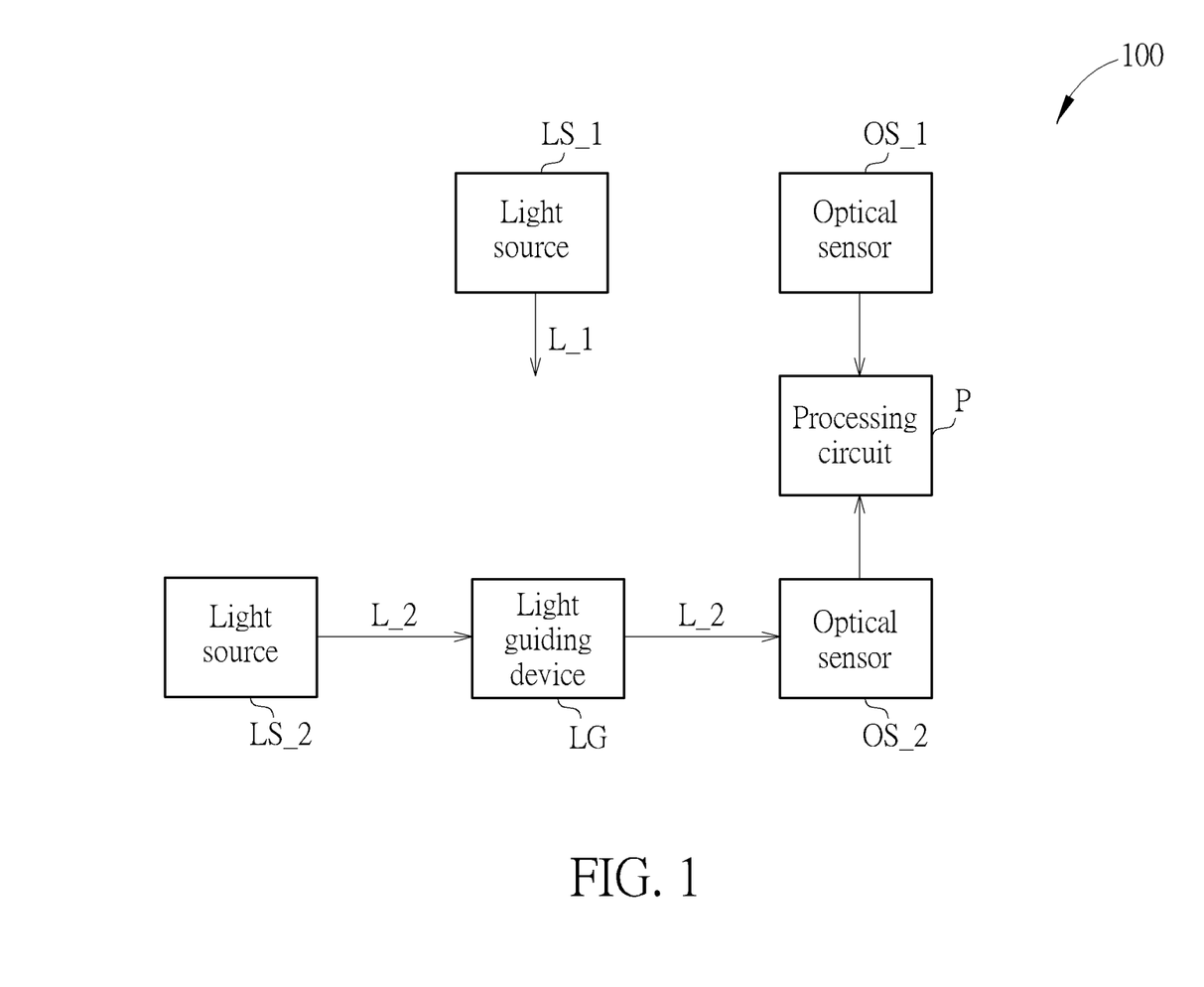
FIG. 1 is a block diagram illustrating an electronic device which can determine a dirtiness level according to one embodiment of the present invention.

FIG. 1 is a block diagram illustrating an electronic device 100 which can determine a dirtiness level according to one embodiment of the present invention. As illustrated in FIG. 1, the electronic device 100 comprises a first light source LS_1, a second light source LS_2, a first optical sensor OS_1, a second optical sensor OS_2, a light guiding device LG and a processing circuit P. The first light source LS_1 is configured to emit first light L_1. The second light source LS_2 is configured to emit second light L_2. The first optical sensor OS_1 is configured to sense first optical data (e.g., image or any other optical data with optical feature) generated based on reflected light of the first light L_1. The light guiding device LG is configured to receive the second light L_2. The second optical sensor OS_2 is configured to sense second optical data (e.g., image or any other optical data with optical feature) generated based on the second light L_2 emitted by the light guiding device LG.

In one embodiment, the electronic device 100 is an optical navigation device, such as an auto clean machine (or named an i-robot), an optical touch sensing device or an optical mouse, and the first optical data is for determining a motion of the electronic device. For example, an optical mouse can compute the motion of the optical mouse according to different images by an image sensor thereof. Detail steps of determining a motion according to optical data are well known by persons skilled in the art, thus are omitted for brevity here.

In one embodiment, the processing circuit P can determine a dirtiness level of the light guiding device LG according to the second light L_2 emitted from the light guiding device LG. For example, the processing circuit P can determine the dirtiness level according a brightness level of the second optical data generated according to the second light L_2 emitted from the light guiding device LG. In one embodiment, the second light L_2 emitted by the light guiding device LG may be blocked by the material (e.g., dust) on the light guiding device LG. Therefore, in such case the processing circuit P determines the dirtiness level is higher than a dirtiness threshold if a brightness level of the second optical data is lower than a brightness threshold. However, in another embodiment, the second light L_2 emitted by the light guiding device LG may be enhanced by the material on the light guiding device LG. Therefore, in such case the processing circuit P determines the dirtiness level is higher than a dirtiness threshold if a brightness level of the second optical data is higher than a brightness threshold.

Besides, in one embodiment, the processing circuit P can determine the dirtiness level according to a light pattern formed by the second optical data. For example, a light pattern which is generated by a clean light guiding device LG can be pre-recorded. After that, if some material such as oil is on the light guiding device LG, the light pattern is changed. Accordingly, the processing circuit P can determine the dirtiness level via comparing an instant light pattern and the pre-recorded light pattern.

Additionally, since the first optical sensor OS_1 for sensing the first optical data and the second optical sensor OS_2 for sensing the second optical data are two different optical sensors, the first light L_1 and the second light L_2 can be emitted simultaneously. However, the first light L_1 and the second light L_2 can also be emitted non-simultaneously.

Figure 2:
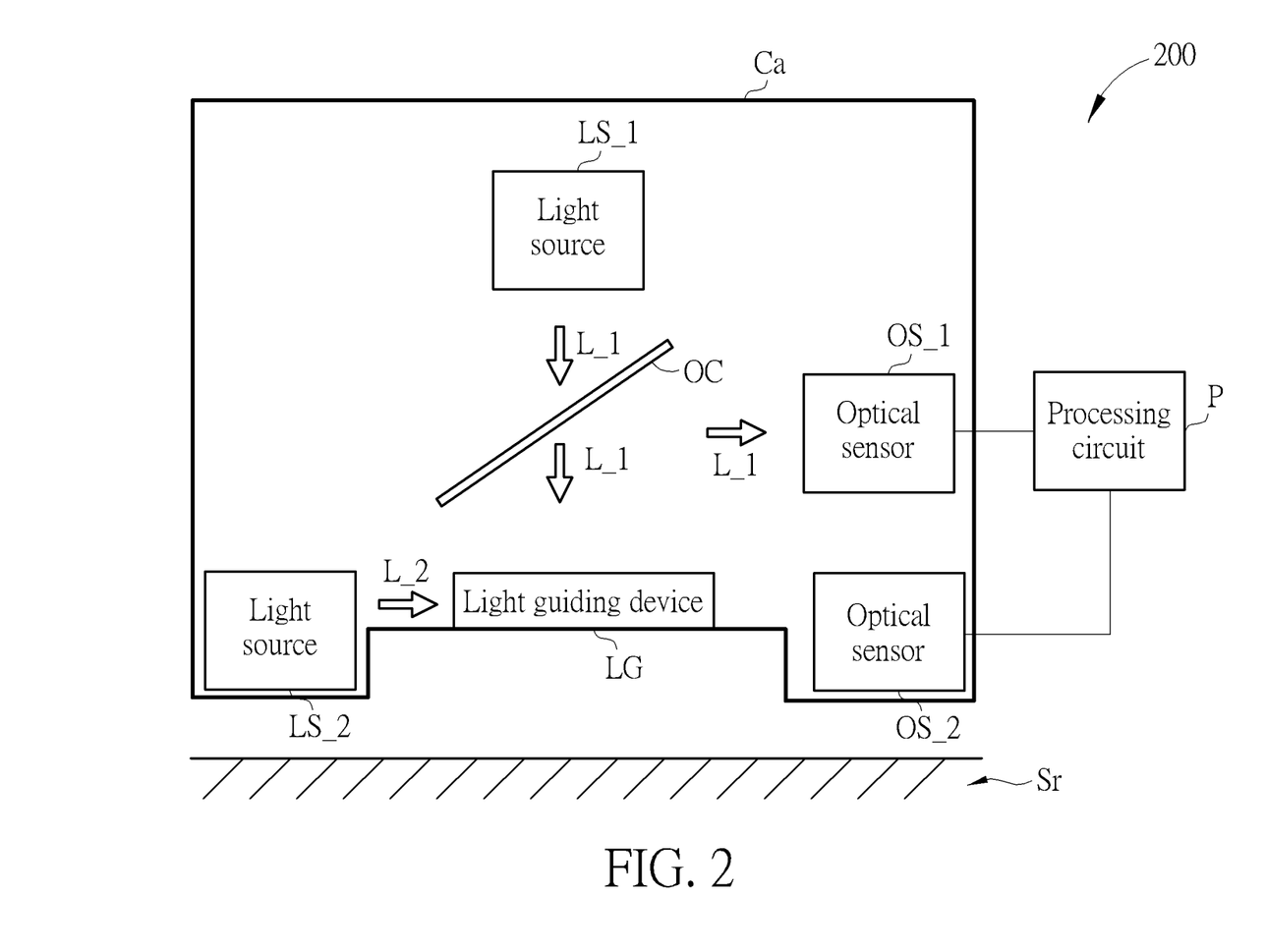
FIG. 2 is a schematic diagram illustrating a detail structure of the electronic device illustrated in FIG. 1, according to one embodiment of the present invention.

FIG. 2 is a schematic diagram illustrating a detail structure of the electronic device illustrated in FIG. 1, according to one embodiment of the present invention. As illustrated in FIG. 2, besides the first light source LS_1, the second light source LS_2, the first optical sensor OS_1, the second optical sensor OS_2, the light guiding device LG and the processing circuit P illustrated in FIG. 2, the electronic device 200 further comprises an optical component OC. The optical component OC is disposed in a transmission path of the first light L_1. Also, the optical component OC can pass partial of the light and reflects partial of the light when light is emitted to the optical component OC. Therefore, when the light source LS_1 emits the first light L_1 to the optical component OC, some of the first light L_1 passes through the optical component OC, the light guiding device LG and is emitted to a surface Sr (e.g., a ground or a desk surface). By this way, the first optical sensor OS_1 can sense the reflected light the first light L_1, thus can sense the first optical data.

Also, in the embodiment illustrated in FIG. 2, the light guiding device LG receives the second light L_2 from the second light source LS_2, and the second optical sensor OS_2 can sense the second light L_2 emitted from the light guiding device LG, thus can sense the second optical data.

Besides, in the embodiment of FIG. 2, the electronic device 200 further comprises a container Ca, which can comprise at least one of: the first light source LS_1, the second light source LS_2, the first optical sensor OS_1, the second optical sensor OS_2, the light guiding device LG and the processing circuit P therein. In the embodiment illustrated in FIG. 2, except the processing circuit P, the first light source LS_1, the second light source LS_2, the first optical sensor OS_1, the second optical sensor OS_2, and the light guiding device LG are comprised in the container Ca. Furthermore, the light guiding device LG is a cover of the container Ca. By this way, the components in the container Ca can be protected by the container Ca and the light guiding device LG.

However, please note the arrangement of the components illustrated in FIG. 1 is not limited to the arrangement illustrated in FIG. 2. Any arrangement which can perform the same function should fall in the scope of the present invention.

Figure 3:
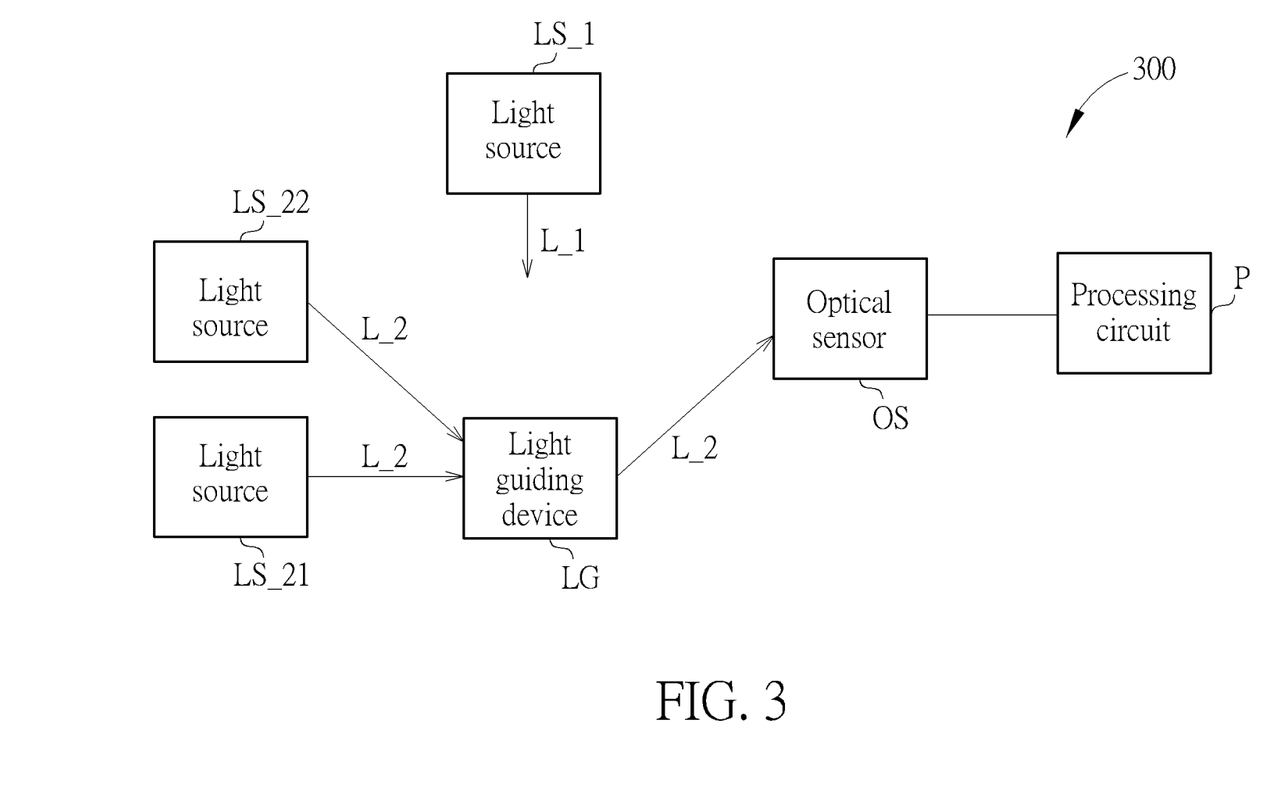
FIG. 3 is a block diagram illustrating an electronic device which can determine a dirtiness level according to another embodiment of the present invention.

The number of the light sources and the optical sensors are not limited to the embodiments illustrated in FIG. 1 and FIG. 2. FIG. 3 is a block diagram illustrating an electronic device 300 which can determine a dirtiness level according to another embodiment of the present invention. As illustrated in FIG. 3, the electronic device 300 comprises a first light source LS_1, at least one second light source (in this embodiment, two second light sources LS_21, LS_22), a light guiding device LG, an optical sensor OS and a processing circuit P.

The first light source LS_1 is configured to emit first light L_1. The second light sources LS_21, LS_22 are configured to emit second light L_2. The light guiding device LG is configured to receive the second light L_2. The optical sensor OS is configured to sense first optical data generated based on reflected light of the first light L_1, and configured to sense second optical data generated based on the second light L_2 emitted by the light guiding device LG.

Figure 4:
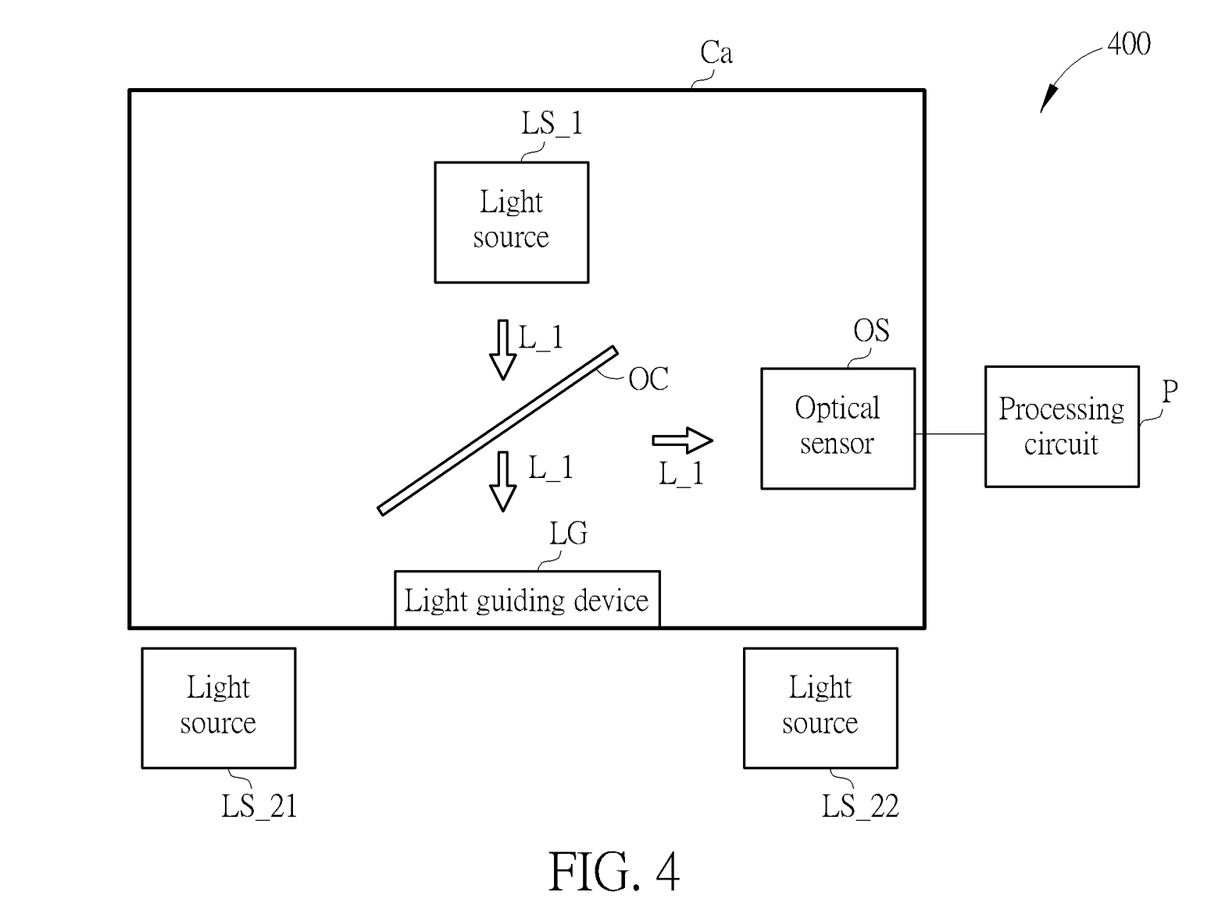
FIG. 4 is a schematic diagram illustrating a detail structure of the electronic device illustrated in FIG. 3, according to one embodiment of the present invention.

FIG. 4 is a schematic diagram illustrating a detail structure of the electronic device illustrated in FIG. 3, according to one embodiment of the present invention. As illustrated in FIG. 4, besides the first light source LS_1, the second light sources LS_21, LS_22, the optical sensor OS, the light guiding device LG and the processing circuit P illustrated in FIG. 3, the electronic device 400 further comprises an optical component OC. The optical component OC is disposed in a transmission path of the first light L_1. Also, can pass partial of the light and reflects partial of the light when light is emitted to the optical component OC. Therefore, when the light source LS_1 emits the first light L_1 to the optical component OC, some of the first light L_1 passes through the optical component OC, the light guiding device LG and is emitted to a surface Sr (e.g., a ground or a desk surface). By this way, the optical sensor OS can sense the reflected light the first light L_1, thus can sense the first optical data.

Also, in the embodiment illustrated in FIG. 4, the light guiding device LG receives the second light L_2 from the second light sources LS_21, LS_22 and the optical sensor OS can sense the second light L_2 emitted from the light guiding device LG, thus can sense the second optical data. Since the electronic device 400 in FIG. 4 uses a single optical sensor OS to sense the first optical data and the second optical data. Therefore, in one embodiment, the first light and the second light are emitted non-simultaneously.

Detail operations of the embodiments illustrated in FIG. 3 and FIG. 4 can be acquired in view of above-mentioned embodiments, thus are omitted for brevity here.

Figure 5:
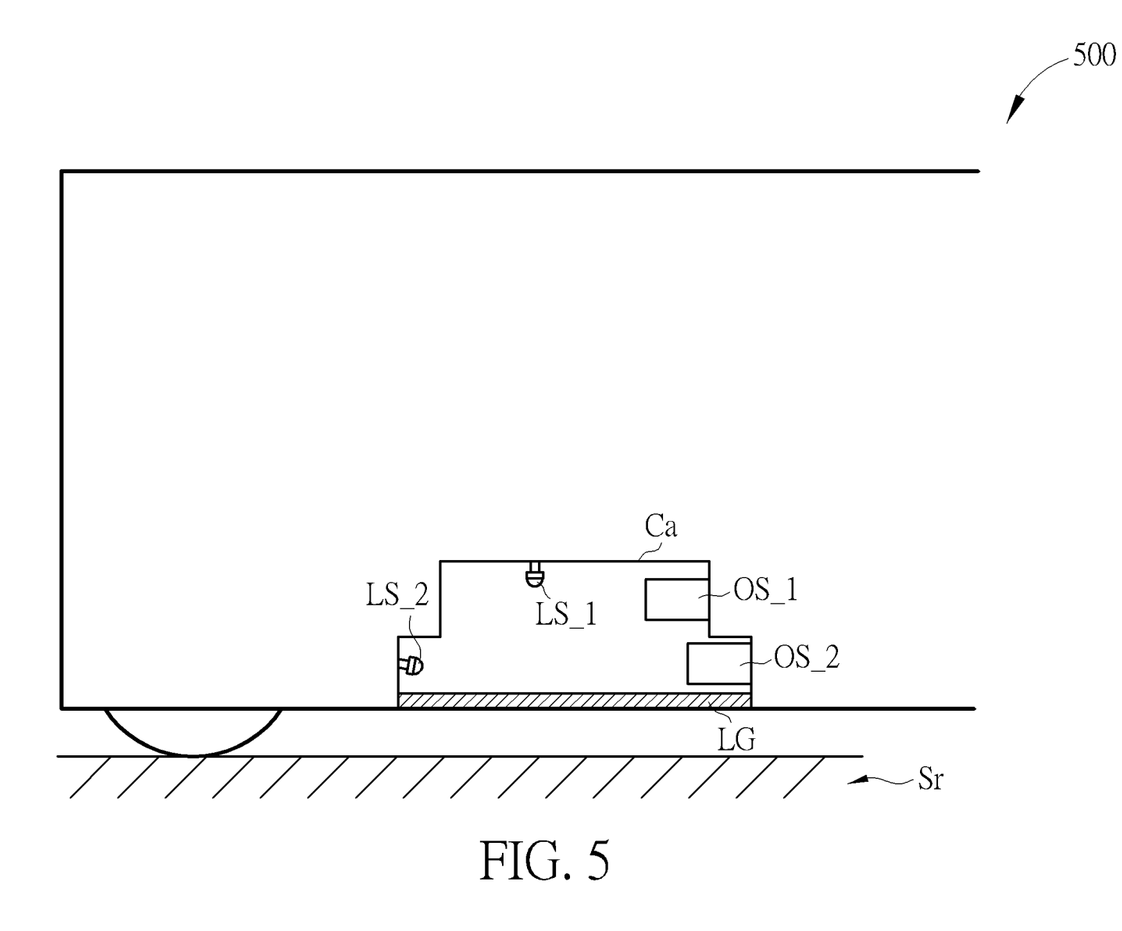
FIG. 5 is a schematic diagram illustrating an auto clean machine provided by the present invention.

As above-mentioned, the electronic devices 100, 200, 300, 400 respectively illustrated in FIG. 1-FIG. 4 can be optical navigation devices. FIG. 5 is a schematic diagram illustrating an auto clean machine provided by the present invention. As illustrated in FIG. 5, the auto clean machine 500 comprises a container Ca, which comprises the first light source LS_1, the second light source LS_2, the first optical sensor OS_1 and the second optical sensor OS_2 provided therein. As above-mentioned, the first optical sensor OS_1 is configured to sense the first optical data for determining a motion of the auto clean machine 500, and the second optical sensor OS_2 is configured to sense the second optical data for determining a dirtiness level of the light guiding device LG. Other kinds of optical navigation device can also use such mechanism. However, the structures illustrated in FIG. 1-FIG. 4 can be applied to any other electronic device rather than limited to be applied for an optical navigation device.

In view of above-mentioned embodiments, the electronic device provided by the present invention can automatically determine a dirtiness level of the light guiding device. If the electronic device is an optical navigation device, the electronic device can automatically determine a dirtiness level of the cover for the optical sensor. Therefore, the user does not need to frequently check whether the cover is clean or not.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a first light source, configured to emit first light;
   an optical component, configured to receive the first light from the first light source, and configured to pass partial of the first light;
   a second light source, configured to emit second light;
   a first optical sensor, configured to sense first optical data generated based on reflected light of the first light, wherein the reflected light of the first light is reflected by the optical component and transmitted to the first optical sensor;
   a light guiding device, configured to receive the second light; and
   a second optical sensor, configured to sense second optical data generated based on the second light emitted by the light guiding device.

2. The electronic device of claim 1, wherein the second optical data is for determining a dirtiness level of the light guiding device.

3. The electronic device of claim 2, further comprising a processing circuit, wherein the processing circuit determines the dirtiness level is higher than a dirtiness threshold if a brightness level of the second optical data is lower than a brightness threshold.

4. The electronic device of claim 2, further comprising a processing circuit, wherein the processing circuit determines the dirtiness level is higher than a dirtiness threshold if a brightness level of the second optical data is higher than a brightness threshold.

5. The electronic device of claim 2, further comprising a processing circuit, wherein the processing circuit determines the dirtiness level according to alight pattern formed by the second optical data.

6. The electronic device of claim 2, wherein the electronic device is an optical navigation device and the first optical data is for determining a motion of the electronic device.

7. The electronic device of claim 6, wherein the electronic device is at least one of: an auto clean machine, an optical mouse and an optical touch sensing device.

8. The electronic device of claim 1, further comprising a container, wherein at least one of the first light source, the second light source, the first optical sensor, and the second optical sensor are located in the container, and the light guiding device is a cover of the container.

9. The electronic device of claim 1, wherein the first light and the second light are emitted simultaneously.

10. An electronic device, comprising:
    a first light source, configured to emit first light;
    an optical component, configured to receive the first light from the first light source, and configured to pass partial of the first light;
    at least one second light source, configured to emit second light;
    a light guiding device, configured to receive the second light; and
    an optical sensor, configured to sense first optical data generated based on reflected light of the first light, and configured to sense second optical data generated based on the second light emitted by the light guiding device;
    wherein the reflected light of the first light is reflected by the optical component and transmitted to the optical sensor.

11. The electronic device of claim 10, wherein the second optical data is for determining a dirtiness level of the light guiding device.

12. The electronic device of claim 11, further comprising a processing circuit, wherein the processing circuit determines the dirtiness level is higher than a dirtiness threshold if a brightness level of the second optical data is lower than a brightness threshold.

13. The electronic device of claim 11, further comprising a processing circuit, wherein the processing circuit determines the dirtiness level is higher than a dirtiness threshold if a brightness level of the second optical data is higher than a brightness threshold.

14. The electronic device of claim 11, further comprising a processing circuit, wherein the processing circuit determines the dirtiness level according to alight pattern formed by the second optical data.

15. The electronic device of claim 11, wherein the electronic device is an optical navigation device and the first optical data is for determining a motion of the electronic device.

16. The electronic device of claim 15, wherein the electronic device is at least one of: an auto clean machine, an optical mouse and an optical touch sensing device.

17. The electronic device of claim 10, further comprising a container, wherein at least one of the first light source, the second light source, the first optical sensor, and the second optical sensor are located in the container, and the light guiding device is a cover of the container.

18. The electronic device of claim 10, wherein the first light and the second light are emitted non-simultaneously.

* * * * *